United States Patent [19]

Newell, Jr. et al.

[11] Patent Number: 4,535,601
[45] Date of Patent: Aug. 20, 1985

[54] ENVIRONMENTAL CONTROL SYSTEM

[75] Inventors: Alfred T. Newell, Jr.; Alfred T. Newell, III, both of Birmingham, Ala.

[73] Assignee: A. T. Newell Co. Inc., Birmingham, Ala.

[21] Appl. No.: 584,387

[22] Filed: Feb. 28, 1984

[51] Int. Cl.³ .............................................. F28D 3/00
[52] U.S. Cl. ........................................ 62/171; 236/49; 165/26
[58] Field of Search ................. 62/171, 304, 121, 309, 62/314, 332; 236/49, 1 E, DIG. 19; 165/16, 26; 261/26, DIG. 3, DIG. 43

[56] References Cited

U.S. PATENT DOCUMENTS

| 3,238,338 | 3/1966 | Nelson | 236/DIG. 19 |
| 3,616,846 | 11/1971 | Wills | 165/26 |
| 4,178,764 | 12/1979 | Rowe | 62/81 |
| 4,270,362 | 6/1981 | Lancia et al. | 236/1 EA |

FOREIGN PATENT DOCUMENTS 2092778 8/1982 United Kingdom ................. 236/49

Primary Examiner—Harry B. Tanner
Attorney, Agent, or Firm—James W. Potthast

[57] ABSTRACT

An environmental control system utilizing a single moisture and dust impervious temperature probe of a multistage thermostat to both control a fogging system in a hog house or the like and other temperature altering devices such as an adjustable ventilation system, fans, heaters and the like. In a cooling cycle of operation, when the sensed temperature rises to a first preselected level, one of the stages causes actuation of one of the temperature cooling apparatus. If the temperature continues to rise to another excessively higher preselected temperature, another stage causes actuation of the fogging system. When the sensed temperature then drops by a preselected amount, the fogging system is deactuated. The actuation and deactuation temperatures are selectively variable to minimize excessive fogging. In the heating cycle of operation, heating devices are suitably controlled in accordance with temperatures.

28 Claims, 6 Drawing Figures

ENVIRONMENTAL CONTROL SYSTEM

BACKGROUND OF THE INVENTION

This invention generally relates to an enclosed environmental control system in which a fogging system of an agricultural animal or bird enclosure building such as a pork or poultry house is controlled solely in accordance with sensed temperatures and, more particularly, to such a control system in which both a fogging system and other temperature altering devices are controlled in accordance with conditions sensed by a single probe.

Modern poultry and pork houses have fogging systems for uniformly spraying atomized water into the house for emergency cooling of the animals. Generally, two parallel water lines extend along the sides of the house which have fog nozzles located along the lines approximately ten foot intervals. The water lines are connected to a high pressure water source through a solenoid controlled valve to maintain a pressure in the lines of 150–200 pounds per square inch, and the nozzle openings are sufficiently small to create a very fine mist. When the solenoid is actuated, the valve is opened, and when the solenoid is deactuated, the solenoid is closed to terminate fogging.

It is known to control actuation of the solenoid controlled valve in accordance with the relative humidity. In such systems, a humidistat with a humidity sensor measures the relative humidity. If the temperature exceeds a preselected limit, such as eighty-five degrees Fahrenheit, when the sensed relative humidity is less than a preselected lower limit, such as ninety percent, the humidistat actuates the solenoid controlled valve to commence fogging. Once fogging commences, the temperature will begin to drop at the approximate rate of ten degrees per hour. As the temperature decreases and the fogging system continues to operate, the relative humidity, of course, rises. It is desired to prevent undesirable excessive wetting of the house and the animals caused by misting under conditions of excessive relative humidity. Accordingly, once the sensed relative humidity exceeds a preselected upper limit, such as ninety percent, the humidistat deactuates the solenoid controlled valve to terminate further fogging regardless of temperature.

Such humidistat controls suffer from the basic disadvantage that it is difficult to maintain the humidity sensor in good working order. Pork and poultry houses are often dusty. Known humidity sensing elements become easily clogged by dirt and moisture, and consequently such sensors have an unsatisfactorily high rate of failure and inaccuracy.

In addition to provision of such fogging systems, it is also customary to provide poultry or pork houses with other means for altering the temperature, such as automatically controlled ventilation louvres like the Auto-Curtain ventilation systems made by the A. T. Newell Co. Inc., assignee of this invention. In such case, it is known to employ a separate thermostat with temperature sensor for controlling operation of such other temperature altering means. Thus, in known systems both a humidistat and a thermostat are required for environmental control in such a building.

SUMMARY OF THE INVENTION

Accordingly, the principal objective of the present invention is to provide an environmental control system for an agricultural building for animal enclosure, such as a pork or poultry house, of the type having a fogging system in which the fogging system is controlled exclusively in accordance with sensed temperature and without reference to relative humidity. Thus, the need for a humidistat and the problems associated therewith are eliminated.

Advantageously, unlike humidistat sensors which can become clogged and are adversely affected by dirt and moisture, the sensor probe of the present invention is advantageously encased in a housing which is impervious to moisture and dirt.

Often such buildings are also provided with other means for altering temperature, and an advantageous feature of the environmental control system is that it includes an electronic thermostat with a plurality of stages for concurrently controlling both the fogging system and the other temperature altering apparatus, such as a ventilation system, in accordance with temperature sensed by the single temperature sensor.

In a preferred embodiment, the electronic thermostat has a plurality of detector stages respectively associated with a plurality of preselected temperatures. Each of said stages generates an actuation signal when a first preselected detection temperature associated therewith is sensed and continues generation until the temperature is altered by a preselected incremental amount relative to said first preselected temperature. Means responsive to the actuation signal from one of the plurality of detector stages actuates the fogging system during generation of this actuation signal and deactuates the fogging system when this actuation signal is terminated.

It has been discovered that actuating the fogging system when the temperature reaches approximately eighty-five degrees Fahrenheit and deactuating it when the temperature drops a two degree hysteristic increment to eighty-three degrees, achieves the needed emergency cooling while avoiding undesirable condensation in most situations. Accordingly, while other control temperature control parameters could be successfully employed, these parameters are preferred. Advantageously, means are provided for adjusting the hysteristic temperature increment in the event that the one which is initially preselected is determined through experience with a particular building to be too large or small.

In keeping with another advantageous aspect of the invention, the different detector stages including the one controlling the fogging system have means for establishing different hysteresis characteristics, so that while the fogging system control may have a two Fahrenheit degree hysteresis, for instance, the other detector stages can have a much lesser hysteresis, such as one half Fahrenheit degree.

It is therefore an object to provide a method of controlling the temperature in a building having a fogging system including the steps of sensing the temperature, actuating the fogging system when the sensed temperature increases to a preselected temperature and deactuating the fogging system when the sensed temperature decreases to another preselected temperature.

In a preferred embodiment for use in a building which also has other means for altering the temperature, a method is provided for controlling both the fogging system and the other temperature altering means with a single temperature sensor.

BRIEF DESCRIPTION OF THE DRAWING

The foregoing objectives, features and advantages will be explained in greater detail and further objects, features and advantages will be made apparent from the appended claims and the detailed description of the preferred embodiment which is given with reference to the several figures of the drawing, in which:

DETAILED DESCRIPTION

Figure 1:
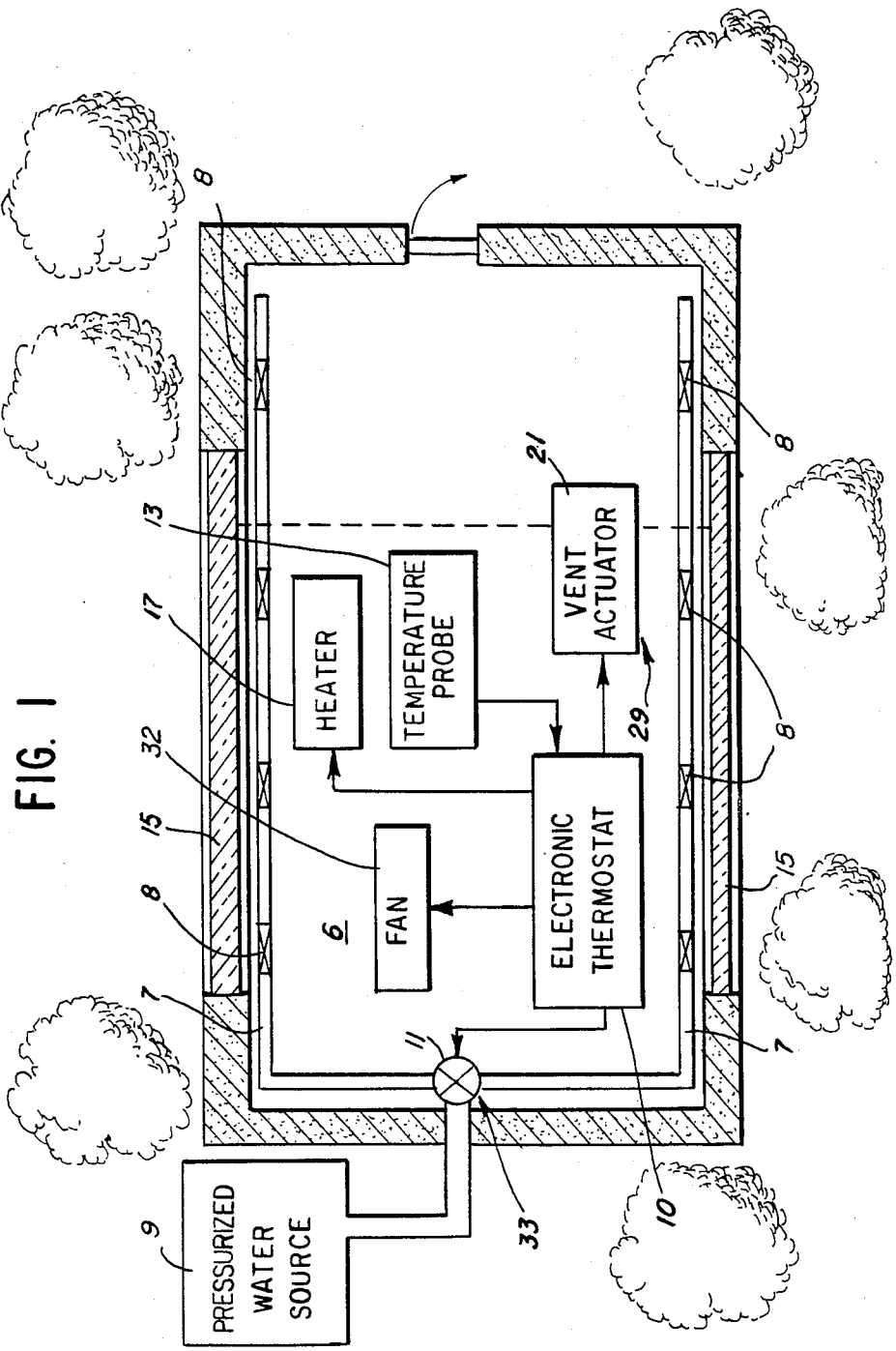
FIG. 1 is a block diagram of a preferred embodiment of the environmental control system of the present invention.

Referring now to FIG. 1, the preferred embodiment of the environmental vented system of the present invention as seen as employed in an agricultural animal enclosure building, such as a poultry or pork house 6 having a fogging system 33 including a pair of parallel water lines 7 with spray nozzles 8 previously spaced along their length at approximately ten foot intervals. Connection of water lines 7 to a source of pressurized water 9 is controlled by means of an electronic thermostat 10. Electronic thermostat 10 controls actuation of a solenoid controlled valve 11 solely in accordance with temperature sensed by a temperature probe 13, such as described below with reference to FIGS. 4, 5A and 5B. When the valve 11 is actuated, water at a pressure of approximately two hundred pounds per square inch is introduced into the lines 7 and sprayed through nozzles 8 thoughout the interior of building 6. When the valve is deactuated, the source 9 is disassembled from lines 7, and the spraying is stopped. The spray may be less atomized in a pork house than in a poultry house.

The electronic thermostat 10 is preferably a multistage thermostat, so that additional temperature altering devices, such as a ventilation system 29 comprising venetian blind-like vents 15 in the sidewalls of building 6 which are automatically adjusted by means of a vent actuator 21. Other temperature altering apparatus controllable by electronic thermostat 10 includes a secondary cooling apparatus such as a fan 32, and a heating device 21.

The temperature at which the various stages respond are selectably variable. With respect to control of the fogging system, however, actuation at approximately 85 degrees Fahrenheit and deactuation of approximately 83 degrees Fahrenheit has been found suitable for a hog house. The temperature at which the ventilation system or fan 19 are actuated are of course significantly lower, than the temperature at which the fogging system is actuated since the fogging system is primarily only for emergency cooling on hot summer days. Normally, the fan 19 and ventilation system 29 are adequate for keeping the temperature beneath an emergency level at which animals can suffer and even die from heat exhaustion or the like.

Figure 2:
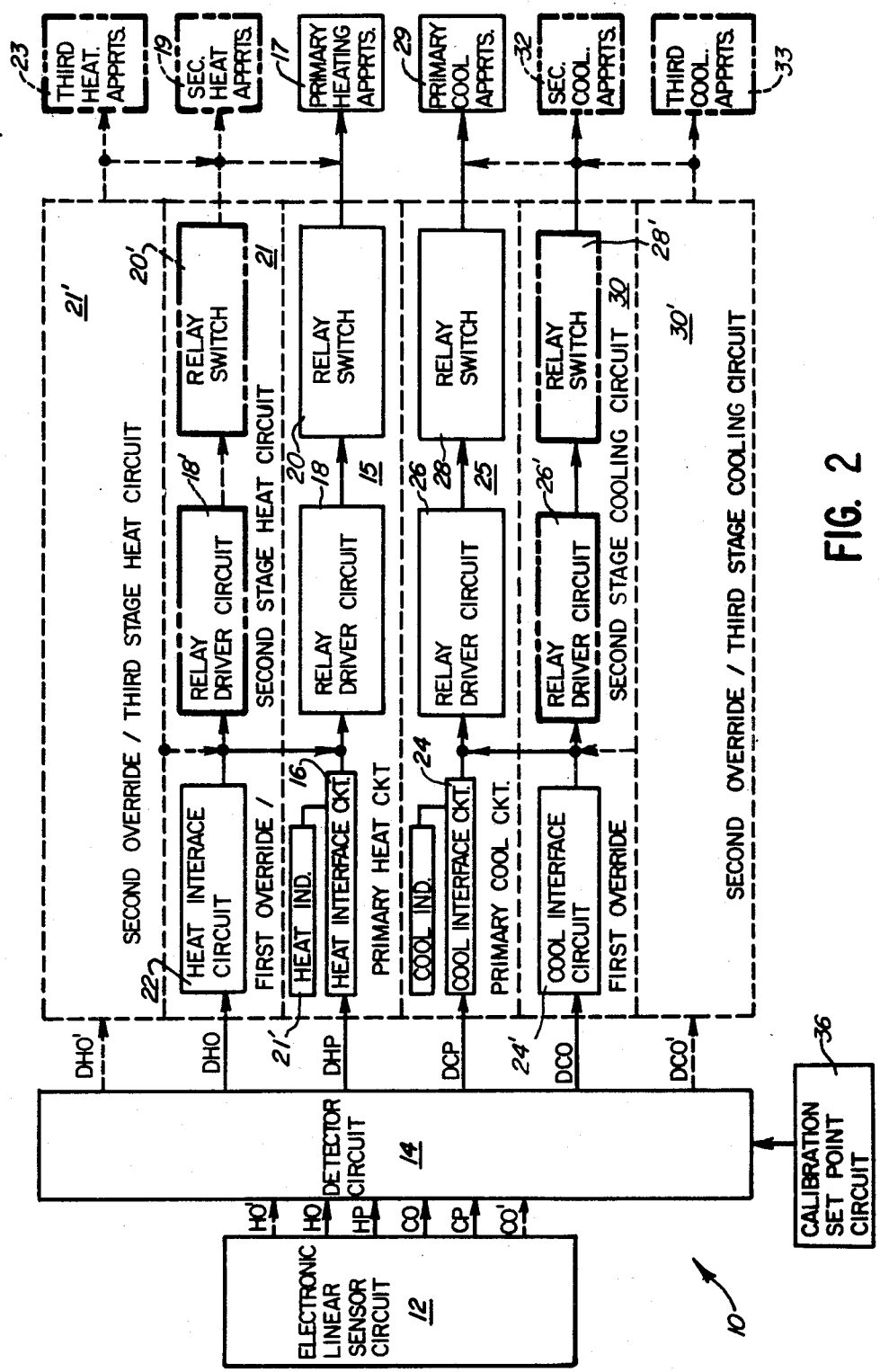
FIG. 2 is a more detailed block diagram of a preferred implementation of the Electronic Thermostat block of FIG. 1.

Referring now to FIG. 2, the preferred embodiment of the electronic thermostat 10 of the present invention includes a unique electronic linear sensor circuit 12 associated with probe 13. Linear sensor 12 produces four different voltage outputs that vary substantially in direct linear proportion with variations in temperature of the sensor environment over a wide range of temperature as compared to a thermistor. Thermistors, which are known to be used in electronic thermostats, unfortunately produce output signals which vary logarithmically. The temperature calibration and other problems that this logarithmic characteristic causes prior electronic thermostats is overcome with the electronic linear sensor circuit 10. In particular, sensor 12 permits simple and accurate calibration of the thermostat with temperature through use of a linear dial that indicates the temperature setting on a linear scale.

Preferably, four different sensor voltage outputs HO (heat override), HP (heat primary), CP (cool primary) and CO (cool override) are connected to the input of a detector circuit 14. In each case, the detector circuit 14 has four detector stages, or detectors, which produce pulses on four outputs DHO, DHP, DCP and DCO in response to the amplitudes of the associated sensor input voltages of leads HO, HP, CP and CO, respectively, reaching a single preselected reference voltage commonly associated with all of the detectors. Alternately, as indicated in broken line, the sensor produces additional sensor voltage signals on outputs HO' (secondary heat override) and CO' (secondary cool override), which are applied to additional detectors of detector circuit 14 that produce responsive detection signals on outputs DHO' and DCO', respectively. Alternately, fewer or more stages are provided, and the modular design illustrated in FIG. 1 facilitates such flexibility.

While control of the fogging system 33 could be under any of the cool detection signals, as an emergency or backup cooling apparatus, it is preferably controlled by either of the override detection signals produced on outputs DCO or DCO'.

The reference voltage is the same for all six detectors for the same temperature setting, while the amplitudes of the four sensor signals on outputs HO', HO, HP, CP, CO and CO' differ from one another by preselected proportional amounts. Accordingly, the detectors generate detection signals at different preselected temperatures. The difference in response temperature for adjacent pairs of detectors may be selected to be the same or to be different depending on the application of the thermostat. For example, an incremental difference of 0.0298 volts between successive detectors at a temperature of 25 degrees centigrade has been found suitable to the desired result of providing a dead zone of approximately 1.6 degrees centigrade between these adjacent stages. However, preferably a larger dead zone of approximately four degrees centigrade is provided between the second and third stage cooling circuits.

The electronic thermostat has two cycles—a heat cycle and a cool cycle. The heat cycle has three stages—a primary heat stage which is activated when a detection pulse is produced on output DHP, a second, or heat override, stage which is activated when a detection pulse is produced on output DHO, and, if provided, a third, or secondary heat override, stage which is activated when a detection pulse is produced on output DHO'. The cool cycle has a primary cool stage which is activated when a detection pulse is produced on output DC, a second, or cool override, stage which is activated when a detection pulse is produced on output DCO, and, if provided, a third, or secondary cool override, stage which is activated when a detection pulse is produced on output DCO'. The pulses are successively produced on outputs DH, DHO and DHO' in response to the temperature decreasing below the set temperature, first by half of the intercycle temperature increment, or dead zone, then by the additional second interstage temperature increment and, finally, by the additional third interstage increment.

For example, presume the set temperature is set at 25 degrees centigrade and both the heat interstage and intercycle cycle temperature increments have been selected as 1.6 degrees centigrade. Then when the sensor temperature drops 0.8 degrees centigrade, or one half of the intercycle temperature increment, to a temperature of 24.2 degrees centigrade, the amplitude of the temperature sensor signal on lead HP will be equal to the reference temperature signal, and a detection pulse will be produced on detector output DHO. This primary heat detection pulse is coupled through a primary heat circuit, or actuator, 15 to actuate a primary heating apparatus 17.

The detection pulse on output DHP is coupled to a heat interface circuit 16 which initiates a preselected time delay. If the primary heat detection pulse remains extant for the duration of the time delay, then a pulse is generated to actuate a relay driver circuit 18, which in turn actuates a relay switch 20. The relay switch 20 then connects power from a suitable electrical power source (not shown) to the primary heating apparatus 17. A visual heat indicator 21 is also actuated in response to the heat detection pulse applied to heat interface circuit 16.

In the event the temperature continues to fall, either because the actuated primary heating apparatus is inadequate or because of failure of the detector associated with detector output DHP, then the second stage detector will generate an override detection pulse on output DHO when the temperature drops another interstage temperature increment to 22.6 degrees centigrade, for instance. This heat override detection pulse is coupled to a heat interface circuit 22 of a first override/second stage heat circuit 21. If this heat override detection pulse remains extant for another, preselected override time delay associated with the heat interface circuit 22, the relay driver circuit 19 generates a pulse to actuate relay switch 20 in the event it has not previously been caused to do so in response to a primary heat detection pulse. This circumstance may arise because the primary time delay is greater than the override time delay, which may be as short as zero time.

Alternately or additionally, as indicated by broken line connections, the heat override detection pulse is coupled through its own relay driver circuit 18' to an associated override relay switch 20'. Relay switch 20' is employed to energize an auxiliary heating apparatus 19 to assist the primary heating apparatus 17 associated with heat relay switch 20. Additionally or alternately, it is connected to separately actuate primary heating apparatus 17 in the event it has not been previously actuated.

If the temperature still continues to fall, then a second override, or third stage, heat detection pulse is generated on detector output DHO' when the temperature reaches 21 degrees Centigrade. This second override pulse is applied to a second override/third stage heat circuit 21' which is substantially identical in structure and operation to the first override/secondary stage heat circuit 21. This second override circuit 21' actuates a separate, tertiary heating apparatus 23. In addition or alternately, it is coupled to one or both of the primary heating apparatus 17 and the secondary heating apparatus 19 for providing backup or override actuation, as indicated by the broken line connections thereto. Also, in addition or alternately, a pulse from its heat interface circuit (not shown) is coupled to one or both of relay driver circuits 18 and 18' to provide override or backup actuation thereto, as indicated by broken line connections thereto.

The cooling cycle has analogous elements and operates substantially the same as the heat cycle circuitry except in reverse with respect to temperature. When the sensed temperature rises above the set temperature by an amount equal to half the intercycle temperature increment, a primary cool pulse is generated on detector output DCP. After a preselected time delay, this pulse is coupled through a cool interface circuit 24 to a relay driver circuit 26 which actuates a cool relay switch 28. The cool relay switch is connectable to control a load, such as the vent actuator 21 of the primary cooling apparatus 29. A cool indicator 31 is actuated by the cool detection pulse whenever the thermostat is operating in the cooling cycle to provide a visual indication of same.

The cool cycle, like the heat cycle, has three stages: a primary cool stage 25 associated with sensor output CP and detector circuit output DCP, a first override/second cool circuit stage 30 associated with sensor output CO and detector circuit output DCO, and an emergency second override/third cool stage 31 associated with sensor output CO' and detector circuit output DCO'. Primary cooling circuit 25, the first override/second stage cool circuit 30 and the second override/third stage cool circuit 30' respectively correspond generally in structure and operation to the heat cycle circuits 20, 21 and 21' with respect to actuation of a primary cooling apparatus, such as ventilation system 29, a secondary cooling apparatus, such as fan 32, and a tertiary or emergency cooling apparatus, such as fogging system 33.

If, even after actuation of the ventilation system 29, the sensed temperature rises by the first interstage temperature increment, a detection pulse is generated on output DCO which is coupled through a cool interface circuit 35 of the first override/second stage cool circuit 30 to relay driver circuit 26 after a preselected override time delay. Alternately, or additionally, the detection pulse is coupled through another relay driver circuit 26' to actuate a relay switch 28' respectively corresponding to relay driver circuit 26 and relay switch 28. Relay switch 28' is connected to the secondary cooling apparatus 32' to connect electrical power thereto. Alternately or additionally, it is connected to the primary or cooling apparatus 29 or fogging system 33.

If the temperature rises by another interstage temperature increment such as four centigrade degrees, an emergency second override/third stage cool circuit 30' responds to a detection pulse DCO' to actuate the emergency fogging system 33, and additionally or alternately, to provide an override pulse to relay driver circuits 26' or 26 and to provide override actuation to either the secondary or primary cooling apparatus 29 and 32.

The temperature is set by means of a calibration/set point circuit 36. Advantageously, since the sensor is linear, the set point scale is linear, and the set point circuit is employed in combination with a simple and effective two point calibration circuit that facilitates simple calibration to different linear scales.

All of the circuits 16, 22, 24 and 35 include time delay circuitry for delaying generation of an output pulse in response to a detection pulse. If the detection pulse is not maintained throughout the time delay period, then the resultant output pulse will be aborted. A time delay of fifteen seconds has been found a satisfactory delay time for the primary circuits 16 and 24 while a delay time of three seconds is preferred for the override circuits 22 and 35. The time delays minimize undesirable rapid cycling due to temperature transients or otherwise.

In addition to performing the override function described above, the override circuits advantageously protect motor loads or the like connected to the relay switches 20 or 28 from "instant on" actuation after momentary loss of power. In the event of loss of power, means are provided for instantly resetting the time delay, such that power will not be coupled to the cooling or heating apparatus until sufficient time has passed for power to come up to full voltage. Damage to motors caused by reapplication of power when voltage is below rated voltage is thereby avoided and reliability further enhanced.

Figure 3:
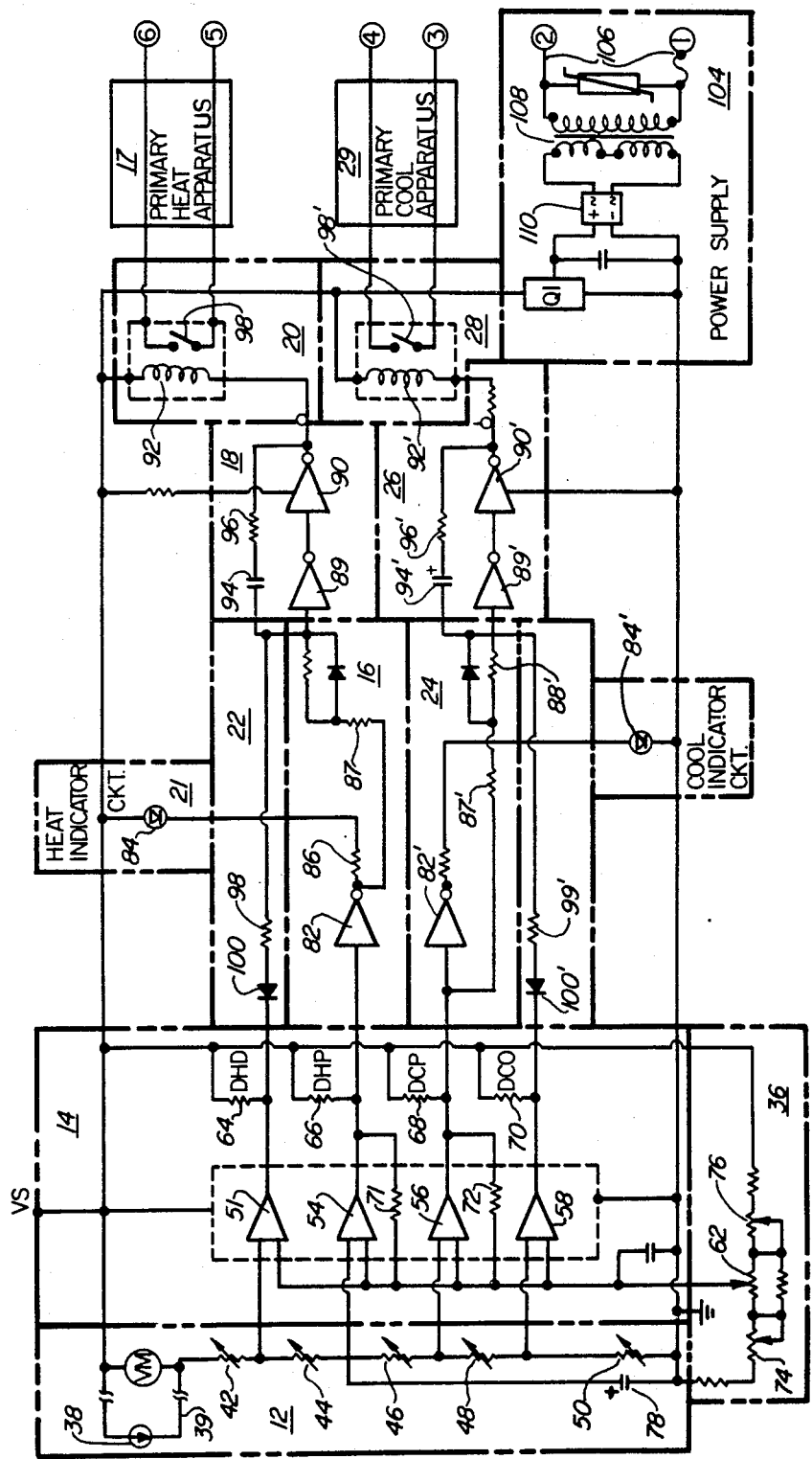
FIG. 3 is a schematic diagram of preferred circuitry for implementing the functional blocks of the Electronic Thermostat block of FIG. 2.

Referring now to FIG. 3, a schematic wiring diagram of a preferred circuit for implementing the functional blocks of FIGS. 1 and 2 is described. For purposes of simplicity, the second override circuits 21' and 30', the relay driver circuits 18' and 26' and the relay switches 20' and 28' will not be shown further or described. It should be understood that these elements operate in the same or similar manner as their counterparts which are identified herein and will be further described below.

The sensor circuit 12 primarily includes a sensor element 38 forming part of probe 13 remotely connected in series between a regulated supply of D.C. voltage VS, at a magnitude such as twelve volts D.C., and a reference potential, such as ground, to form a current source. The circuit connection to ground is through a plurality of series resistors 42, 44, 46, 48 and 50 that form a voltage divider. The magnitude of the current through resistors varies in direct proportion with variations of temperature of the sensor element 38. Preferably sensor element 38 comprises a two terminal, integrated circuit, linear temperature-current transducer having a linear absolute temperature characteristic, such as transducer AD590, manufactured by Analog Devices of Norwood, Mass.

The resistors 42, 44, 46, 48 and 50 form a voltage divider having four outputs HO (heat override), HP (heat primary), CP (cool primary) and CO (cool override) which are connected between resistor pairs 42 and 44, 44 and 46, 46 and 48, and 48 and 50. Sensor voltage signals are produced on these sensor outputs which vary linearly with changes in current of the sensor circuit source 38 and thus linearly vary with changes of the sensed temperature. The sensor element 38 is preferably located remotely from the remainder of the sensor circuit 12 and connected thereto by means of an elongate coaxial cable 39 or the like. With this remote connection, accuracy is improved. The sensor circuitry is preferably located in a different, stabler thermal environment than the sensor element 38 so as not to be effected thereby. Likewise, effects on the sensor element 38 of heat from the sensor circuitry is avoided to obtain improved accuracy and reliability.

The magnitudes of the voltages are different from one another by a proportional amount dependent upon the relative magnitudes of the resistors. In the preferred embodiment, resistors 42, 44, 46 and 48 have a preselected value to establish an interstage or intercycle temperature increment of 1.6 degrees centigrade for the calibration scale which was selected. However, presuming the fogging system 33 is controlled by the second cooling stage, then an increment of approximately four centigrade degrees between 28.2 degress centigrade and 32.0 degrees centigrade, is provided. If the fogging system is controlled by the third stage, then this increment of four degrees is provided between the second and third cooling stages. Alternately, one or more of the voltage divider resistors including resistors 42, 44, 46, 48 and 50 are variable resistors to permit simple adjustment of dead zones and relative actuation temperatures.

The four sensor outputs HO, HP, CP, CO are respectively coupled to inputs of four detectors, or comparators, circuits 52, 54, 56 and 58. The other inputs of these comparator circuits are all connected together by a lead 60 to the wiper of a set point potentiometer 62 of calibration/set point circuit 36 for establishing a variable reference voltage. Whenever a particular sensor output voltage reaches the reference voltage applied to its associated comparator circuit, the comparator circuit generates a detection pulse to indicate that its associated temperature has been reached. The detector outputs DHO, DHP, DCP and DCO are coupled to the D.C. supply voltage VS through individual pull-up resistors 64, 66, 68 and 70, respectively, so that strong 1-state logic signals are produced on the outputs of the comparator circuit whenever they switch to a logic 1-state.

In keeping with another aspect of the invention, the third stage cool unit 30', FIG. 2, is provided with a position feedback resistor to establish a hysteresis in the detection characteristic. Comparator circuits 54 and 56 are also provided with positive feedback resistors 71 and 72. The positive feedback creates a hysteresis in the switching characteristics of the comparator circuit such that generation of a detection pulse occurs at a higher temperature for heat cycle comparator 54 and at a lower temperature for cool cycle comparator 56 than the temperature at which the detection pulse is terminated. A ten megaohm resistor has been found suitable to provide a 0.22 centigrade degree hysteresis differential on the comparator circuits 54 and 56 which is believed sufficient to prevent relay chatter and minimize rapid cycling. In addition, as generally indicated, a dead zone is created between the heating and cooling cycles and between intracycle stages.

Referring also to FIG. 2, in the situation in which the outputs of either the second stage cool circuit 30 or the third stage cool circuit 30' is connected to solenoid controlled valve 11 of the fogging system 33, then the comparator circuits associated therewith, comparator 58 for instance, is provided with a feedback resistor, corresponding to resistor 72 for instance, to establish a larger hysteresis characteristic in operation of the fogging system 33. Preferably, the value of feedback resistor is selected to provide a hysteresis temperature differential between actuation and deactuation of approximately one centrigrade degree or two Fahrenheit degrees when the actuation temperature is approximate 85 degrees Fahrenheit.

Advantageously, the hysteresis establishing feedback resistor associated with the fogging system is preferably a variable resistor to enable optimization of the systems for different environments or changing circumstances. During operation of the environmental control system, if wetting should result, the operator can adjust the variable resistor to reduce the hysteresis. Alternately, the hysteresis can be increased. As already noted, the temperature at which the fogging system 33 is actuated can also be adjusted, for purposes of optimizing the control.

The set point and calibration circuit includes two set point calibration potentiometers 74 and 76 to provide two point calibration. Potentiometer 74 is used to set the upper end of the set point voltage to correspond to the upper limit of the temperature scale, such as one hundred degrees centigrade, and potentiometer 76 is used to set the lower end of the set point voltage to correspond to the lower limit of the temperature set point scale, such as zero degrees centigrade. The signal produced on output HP is preferably used as the sensor output for calibration purposes. A capacitor 78 connected to sensor output HP and a capacitor 80 connected to reference voltage lead 60 provide filtering to prevent relay chatter and undesirable switching oscillation.

The remaining circuitry is best described with reference to the various stages of operation. Presume that the set point potentiometer 62 is set to establish a reference voltage corresponding to 25 degrees centigrade and the sensor is producing a sensor signal representative of 24 degrees centigrade at sensor output HP. Then the output voltage on output HP will be less than the reference voltage. This condition will cause comparator 54 to switch to a 1-state condition with a 1-state signal on its output DHP equal to supply voltage VS. This 1-state heat detection signal is inverted by an inverter 82 of the relay driver 16 which produces a resultant 0-state signal at its output.

The 0-state detection signal at the output of relay driver circuit 82 is coupled to both the heat indicator circuit 13 and to the remaining time delay portion of the interface circuit 16. The heat indicator circuit 13 comprises an LED 84 connected between the D.C. supply voltage VS and the output of inverter 82 through a current limiting resistor 86. When the output switches to a 0-state, the LED is caused to light to indicate primary heat is being called for.

The time delay portion of the interface circuit 16 includes a pair of resistors 87 and 88 connected in series between the output of inverter 82 and the input of the first stage amplifier 89 of relay driver circuit 18. The output of amplifier 88 is connected to a second stage amplifier 90, the output of which is connected to one side of a relay coil 92 of heat relay switch 20. This same side of relay coil 92 is also coupled to the input of amplifier 88 through a time delay capacitor 94 and a series resistor 96.

Before the output of amplifier 82 switches to a 0-state, capacitor 94 is charged to the supply voltage VS and thus a 1-state signal is applied to the input of amplifier 88, and the relay coil 92 is not energized. However, when the 0-state detection pulse is produced on the output of amplifier 82, the capacitor is discharged through resistors 87, 88 and 96 at a rate dependent upon the values of these components. Preferably, the values are selected so that it takes approximately fifteen seconds for capacitor 94 to discharge to a point where the voltage at the input to amplifier 88 reaches its 0-state threshold. When this happens, amplifier 88 switches its output to a 0-state to actuate relay coil 92. When relay coil is actuated, switch 98 is closed to apply power to the primary heating apparatus 17.

If the pulse does not continue for the time delay period, then the capacitor 94 will be recharged before the input to amplifier 88 reaches a 0-state condition, and the relay coil 92 will not be energized. Thus, false starts due to transient dips in sensed temperatures and rapid cycling are avoided. Rapid cycling is also minimized because of the hysteresis provided by positive feedback resistor 71.

If the temperature continues to fall, then comparator 52 will switch to a 0-state when the temperature drops to the associated heat override temperature. When this happens, capacitor 94 is also discharged through a resistor 98 and a diode 100 of the heat interface circuit 22 at a rate determined in part by the value of resistor 98. Presuming that the principal heat detection pulse on lead DHP was not generated, then the heat override interface circuit 22 will discharge the capacitor in approximately three seconds to the 0-state level or within such other time period as may be selected. If the capacitor is already partially discharged, then the time period will be less. As noted above, with reference to FIG. 1, alternately, or in addition, the heat override interface circuitry is used to drive a separate relay driver circuit 18' to actuate another relay switch 20' which are identical in structure and function as the heat relay driver circuit 18 and the relay switch 20, respectively.

In addition to functioning to couple the override pulse to the relay driver on a time delayed basis, the heat override interface circuit 22 protects motor loads connected to the relay switch 20 from "instant on" activation whenever power is applied. If A.C. power is momentarily lost and then reapplied, the capacitor 94 is quickly recharged through a diode 102 and another delay is required before the capacitor discharges to again energize the relay.

The cool primary interface circuit 24, the cool override interface circuit 30, the cool relay driver circuit 26 and cool relay switch 28 are virtually identical in structure and function as the corresponding circuits of the heat cycle circuitry, the heat primary interface circuit 16, heat override interface circuit 22, heat relay driver circuit 18 and heat relay switch 20, respectively, except as indicated. All corresponding parts operate in substantially the same way except as indicated, and thus the operation will not be described in detail.

In FIG. 3, corresponding parts have been given the same reference numeral followed by a prime mark. An amplifier 82' generates a 1-state pulse to cause an LED 84' to provide a light indication that a 0-state cool primary detection pulse has been generated on output DCP. At the same time, the 0-state pulse causes a capacitor 94' to discharge through resistors 96', 88' and 87'. A diode 102' is provided to quickly charge capacitor 94' when power is reapplied. The detection pulse is amplified by amplifiers 89' and 90' and applied to a relay coil 92' to close a switch 98' and actuate primary cooling apparatus 29. If the temperature rises to the cool override detection temperature, then a 0-state cool override detection pulse will cause discharge of capacitor 94' through a diode 100' and a resistor 98.

The second override/third stage heat circuits 21' of FIG. 2 is constructed substantially the same and operates the same as the primary cool circuit 25 or the first override/second stage heat circuits 21. As discussed above, the second override/third stage cooling circuit 30' is constructed substantially the same and operates substantially the same as the primary cool circuit 25 except it has a higher actuation temperature and a larger hysteresis characteristic.

The temperature in building 6 is thus controlled by sensing the temperature in building 8 with probe 13 and first actuating a temperature altering means, such as ventilation system 29 or fan 32, when the temperature remains to a first preselected temperature, such as 75 degrees Fahrenheit. If the sensed temperature continues to rise, then either the second or third stage cooling circuit actuates the fogging system 33 when the sensed temperature reaches a second preselected temperature, such as 85 degrees Fahrenheit. If the third stage cooling circuit 30' actuates the fogging system 33, then the second stage cool circuit 30 actuates a secondary cooling apparatus, such as fan 32, at a lower sensed temperature. Alternately, a signal from the second stage cool circuit 30 can be disregarded. Thus, when the temperature decreases to a third preselected temperature, such as 83 degrees Fahrenheit, whichever of the second or third stage cool circuits is connected to the fogging system 33 will deactuate it. Preferably, this third preselected temperature is less than said second preselected temperature and greater than said first preselected temperature. When the sensed temperature drops to a fourth preselected temperature, the primary cooling apparatus is deactuated. Preferably, this fourth preselected temperature is lower than all the other preselected temperatures. Thus, both a fogging system and other cooling apparatus are controlled through use of the single sensor 38.

The cooling apparatus 29 and 32 may comprise any type or combination of devices, including electric or fuel powered cool air conditioning units, ventilation controls, fans, dehumidifiers or the like. Twelve volt D.C. power is provided on power terminal VS by a suitable power supply circuit 104 having a pair of leads 106 for connection with an A.C. power source, and a transformer 108, rectifier 110, a capacitor 112 and a transistor 114 for producing a regulated D.C. voltage therefrom.

Figure 4:
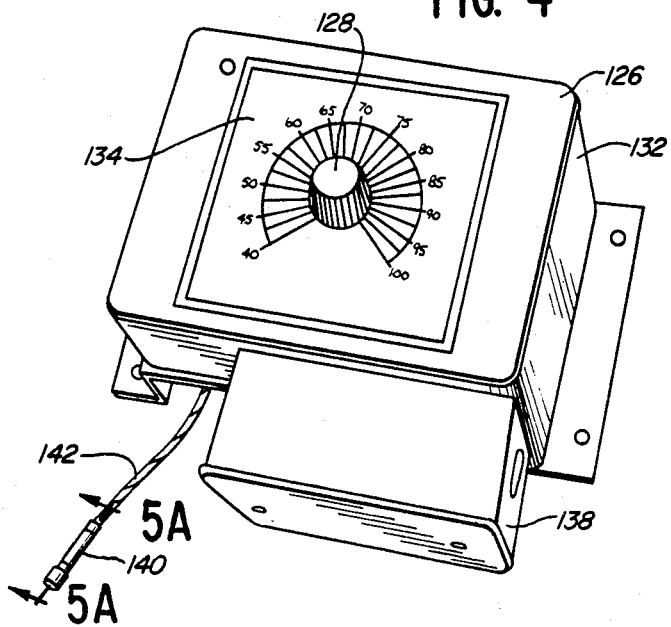
FIG. 4 is a perspective view of the electronic thermostat of FIGS. 1, 2 and 3 contained within its moisture and dirt impervious housing and illustrating a preferred embodiment of the remote temperature sensing probe.

Referring now to FIG. 4, the electronic thermostat is seen to include a metal housing 126 within which is mounted the electronic thermostat circuitry of FIGS. 1 and 2. The wiper blade of set point potentiometer 62 is operated by a rotary knob 128 mounted at the center of a linearly graduated temperature scale. The LED 84 and LED 84' are also mounted to the housing 126 opposite transparent lenses 132 and 134, respectively. The power supply circuitry and relay switches 20 and 28 and terminals for making the necessary circuit connections are mounted within a sub-assembly housing 138 which is attached to housing 132. The sensor element is preferably mounted within a protective tube 140 and is connected to the remaining circuitry by an elongate coaxial cable 142.

Figure 5A:
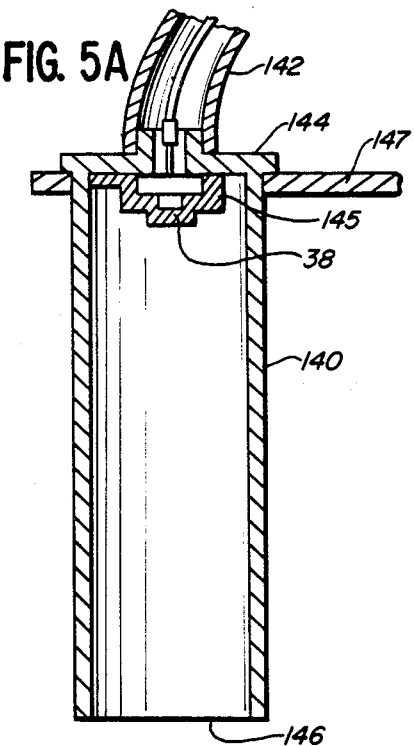
FIGS. 5a and 5b are cross-sectional views of different forms of the temperature probe of FIG. 4.

Referring to FIG. 5A, in one embodiment of the sensor probe 13, the tube 140 is formed of stainless steel, hard plastic or the like. It is painted black, so that it interacts with its environment as a thermal black body radiating heat to the sensor element 38. The sensor element 38 is mounted adjacent the closed, or connection, end 144 and is protectively sealed against moisture or dust with a thin layer 145 of epoxy or the like. The tube is mounted to a ceiling, wall or other structure by means of a bracket 147 with its open end 146 pointing downwardly, so that it responds only to vertically directed heat waves. The sensor element 38 is set back several inches from the open end 146 also for the reason that it is protected from drafts which might cause it to respond to transient, localized temperature changes.

Figure 5B:
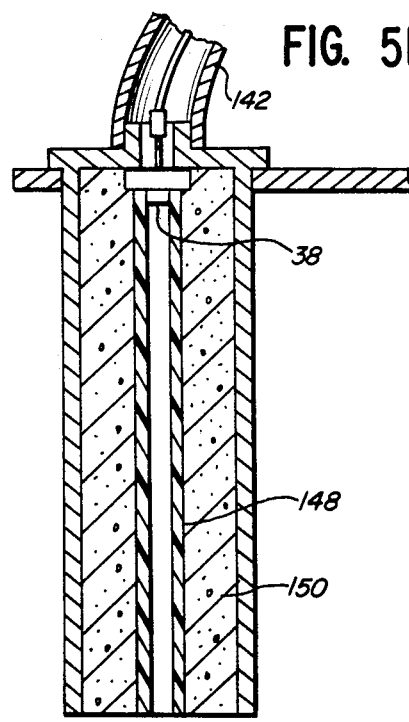

Referring to FIG. 5B, another embodiment of the sensor probe is shown in which the sensor element 38 is encased in another steel or plastic tube 148 by means of a thermally conductive moisture or dust impervious cement 150 or the like. With the sensor element 38 located adjacent the end of the tube opposite the cable 142, this probe has been found to provide a much faster thermal response than of the probe of FIG. 5A.

It should be appreciated that while a particular embodiment has been disclosed, the invention for which protection is sought is not so limited, but rather is defined by the claims. Many variations will be obvious to the skilled person of the environmental control art without departing from the scope of the invention. For instance, although the circuitry has been previously illustrated with three stages for each cycle, embodiments with more than three cycles are generally disclosed and contemplated. Also, the relays and loads associated therewith may be connected in any number of combinations that are useful but which are not necessarily as shown. Likewise, while the temperature given to define actuation, dead zones, and hysteresis characteristics are preferred, the invention can be successfully employed with other temperatures.

We claim:

1. In a building having a fogging system for spraying atomized water into a building for cooling animals and or birds contained therein, an improved environmental control system, comprising:
   an electronic thermostat including
      means for sensing the temperature within the building including a probe with a sensor and means for protecting the sensor from direct contact with the atomized water sprayed into the building, and
      means for generating an actuation signal when a preselected temperature associated therewith is sensed by said sensing means and until the temperature is altered by a preselected incremental amount relative to said first preselected temperature; and
   means responsive to the actuation signal for actuating said fogging system while said actuation signal is being generated and for deactuating the fogging system when said actuation signal is terminated.

2. The temperature control system of claim 1 in which said fogging system has a source of pressurized water and a plurality of spray nozzles, and said actuation signal responsive means includes
   a solenoid controlled valve for interconnecting said plurality of spray nozzles with said source of pressurized water when energized, and
   means for energizing said solenoid controlled valve during generation of actuation signal.

3. The environmental control system of claim 1 in which
   said electronic thermostat has a plurality of stages respectively associated with a plurality of preselected temperatures for generating said actuation signals when the sensed temperature reaches the associated preselected temperature and terminating said actuation signals when the temperature is altered by an associated preselected increment, and said fogging system actuating means is primarily responsive to only one of said stages.

4. The temperature control system of claim 3 in which
said building has a ventilation system, and
said electronic thermostat has a stage associated therewith for generating another actuation signal when another preselected sensed temperature associated therewith is reached, and including means responsive to said other actuation signal for actuating said ventilation system.

5. The temperature control system of claim 4 in which said other temperature is lower than said first mentioned preselected temperature.

6. The temperature control system of claim 4 in which said first mentioned actuation signal is generated until the sensed temperature decreases by said preselected incremental amount.

7. The temperature control system of claims 1 or 6 in which said preselected incremental temperature amount is on the order of two Fahrenheit degrees.

8. The temperature control system of claim 7 including means for selectively varying the preselected incremental temperature amount.

9. The temperature control system of claim 1 in which said preselected temperature is on the order of eighty-five degrees Fahrenheit.

10. The temperature control system of claims 1 or 9 in which the preselected incremental temperature amount is on the order of two Fahrenheit degrees.

11. The temperature control system of claim 1 in which said probe includes an elongate probe housing for protectively encasing the sensor against moisture from said fogging system or dust from the building.

12. The temperature control system of claim 3 in which said building has other temperature altering means and including means responsive to the other actuation signals from said electronic thermostat for actuating said other temperature altering means, respectively.

13. The temperature control system of claim 3 in which said one stage includes
a detector for generating a detection pulse in response to said sensed temperature reaching said preselected temperature associated therewith, and
means for introducing hysteresis to said detector to cause it to continue generating said detection signal until the sensed temperature decreases by a preselected incremental amount.

14. The temperature control system of claim 13 in which said hysteresis characteristic causes said preselected incremental amount to be approximately two Fahrenheit degrees.

15. The temperature control system of claim 13 in which
said other stages have detectors, and
means for introducing a hysteresis thereto which is substantially less than that introduced to the detector of said one stage.

16. A method of controlling the temperature in a building having a fogging system for spraying atomized water into the building comprising the steps of:
sensing the temperature within the building;
actuating the fogging system when the sensed temperature increases to a first preselected temperature regardless of the relative humidity in the building; and
deactuating the fogging system when the sensed temperature decreases to a second preselected temperature which is less than said first preselected temperature regardless of the relative humidity in the building.

17. The method of claim 16 in which said building has other means for altering the temperature therein, and including the steps of
actuating the other temperature altering means when the sensed temperature increases to a third preselected temperature; and
deactuating the other temperature altering means when the sensed temperature decreases to a fourth preselected temperature.

18. The method of claim 17 in which said step of sensing the temperature comprises the step of sensing the temperature with a dust and moisture impervious temperature probe.

19. The method of claim 17 in which said fourth temperature is less than said second temperature.

20. The method of claim 17 including the step of actuating a heating apparatus in response to the sensed temperature decreasing below the fourth temperature by a preselected amount.

21. The method of claim 17 in which said first preselected temperature is approximately eighty-five degrees Fahrenheit and said second preselected temperature is approximately eighty-three degrees Fahrenheit.

22. The method of claim 17 in which said step of actuating the fogging system includes the steps of
generating a detection signal with a detector in response to said sensed temperature increasing to said first preselected temperature,
introducing a hysteresis characteristic to said detector to cause it to continue generating said detection signal until the sensed temperature decreases to said second preselected temperature, and
maintaining said fogging system actuated as long as the detection signal is being generated.

23. The method of claim 16 including the step of selectively varying said preselected incremental amount to minimize excessive or inadequate fogging.

24. The method of claim 16 including the step of selectively varying the preselected temperature to prevent excessive or inadequate fogging.

25. The temperature control system of claim 11 in which said probe housing has a closed end at which the sensor is located and an opposite end substantially spaced therefrom which is open to atmosphere and in fluid communication with said sensor.

26. The temperature control system of claim 25 in which said probe housing includes an elongate conduit wall of thermally conductive moisture or dust impervious material interconnecting the sensor and the open end.

27. The temperature control system of claim 11 in which said sensor is encased in moisture impervious, heat conductive cement-like material within the probe housing.

28. The temperature control system of claim 11 including means for mounting said probe housing within said building and protruding away from an interior wall thereof.

* * * * *

UNITED STATES PATENT AND TRADEMARK OFFICE
CERTIFICATE OF CORRECTION

PATENT NO. : 4,535,601

DATED : Aug. 20, 1985

INVENTOR(S) : Alfred T. Newell, Jr. and Alfred T. Newell III

It is certified that error appears in the above-identified patent and that said Letters Patent is hereby corrected as shown below:

(75) Inventors: delete the comma after "Newell" (second occurrence);

Col. 3, line 44, change "thoughout" to - throughout -;

Col. 8, line 66, change "centrigrade" to - centigrade -;

Col. 8, line 67, change "approximate" to - approximately -;

Col. 12, line 32, delete "and", and substitute therefor - such as -; and

Col. 12, line 33, delete "or".

Signed and Sealed this

Fifteenth Day of December, 1987

Attest:

DONALD J. QUIGG

*Attesting Officer*  *Commissioner of Patents and Trademarks*